United States Patent Office 2,863,762
Patented Dec. 9, 1958

2,863,762

RECOVERY OF NOBLE METALS

Joseph B. Pullen, Mount Prospect, Ill., assignor to Universal Oil Products Company, Des Plaines, Ill., a corporation of Delaware No Drawing. Application December 28, 1956
Serial No. 631,047

14 Claims. (Cl. 75—121)

The present invention is related to the recovery of noble metals and is particularly directed toward a method for recovering noble metals, substantially free from arsenic, from deactivated catalytic composites comprising a noble metal component in combination with a refractory inorganic oxide and other catalytic components.

Noble metal-containing catalysts are extensively employed throughout commercial industries for promoting a multitude of chemical reactions among which are cyclization, hydrogenation, dehydrogenation, isomerization, aromatization, dehydrocyclization, sulfonation, etc. After extended periods of use, the particular catalyst employed generally becomes deactivated and incapable of performing its intended function to an acceptable degree. Such catalytic deactivation may result from substances which are either peculiar to a particular catalyst or generally detrimental to most catalysts, a change in the physical state of the components of the catalyst or a loss of said components, or from the deposition of impurities in the form of solids which shield the catalytically active surfaces from the materials being processed. Generally, the deposition of coke and other carbonaceous material is a direct cause of catalyst deactivation, and usually occurs in combination with one of the previously described causes of catalyst deactivation. Also, a catalytic deposit often becomes deactivated through the deposition of aresenic which, as is well known, need not necessarily be deposited to any great extent in order to create serious deactivation. Concentrations of arsenic as low as 20 to 50 parts per million (based upon the total weight of the catalytic composite) are sufficient to cause the catalyst to become deactivated to a degree whereby it is no longer employed to economic advantage.

The presence of arsenic is objectionable in many metals and metallic compounds, and arsenic is especially objectionable when found in noble metals and compounds thereof. In those instances where the noble metals and/or their compounds are employed either as a catalyst or as an active catalytic component of a catalyst, minute quantities of arsenic may be detrimental both to the activity of the catalyst and to the length of time such catalyst is capable of acceptable performance. Although the present invention is specifically directed to the removal of arsenic from noble metals, compounds thereof, and composites containing the same, it is understood that the method is applicable for the removal of arsenic from other metals and their compounds.

The coke and other carbonaceous material is frequently removed by burning the deactivated catalyst in a free oxygen-containing atmosphere, such as air, which to all appearances has the effect of producing an active catalyst. Other, more recent methods of catalyst reactivation, used in conjunction with the air-oxidation treatment of the deactivated catalyst, are employed to revert the various catalytic components to their most active state thereby producing a catalyst which is nearly identical in composition and activity to the catalyst prior to use.

As hereinbefore set forth, the present invention is specifically directed to the recovery of noble metals from noble metal-containing catalytic composites. In the interest of simplicity, the following specification is limited to those catalytic composites which comprise platinum or palladium; it is understood that the method is applicable to the recovery of other metals, and that platinum or palladium need not necessarily be present in combination with the other metals and/or their compounds.

Catalytic composites from which the metal component may be recovered, substantially free from arsenic, through the method of the present invention, include metals such as, but not limited to, vanadium, iridium, rhodium, rhenium, ruthenium, mixtures of two or more, etc. The metal component can exist in the elemental state or in some combined form such as the halide, oxide, nitrate, sulfate, etc. Other metals and their compounds may be composited with the previously described metal components, and include such metals as chromium, tungsten, cobalt, copper, alkali metals, silver, gold, molybdenum, nickel, magnesium and other alkaline-earth metals, mixtures of two or more, etc.

Generally, the quantity of the metal component composited with the catalyst is small compared to the quantities of the other components combined therewith. For example, platinum and/or palladium, when employed as the active catalytic component, comprises from about 0.01% to about 5% by weight of the total catalyst, and usually from about 0.1% to about 1% by weight. The use of the other metal components, with or without platinum and/or palladium, is dependent upon the use for which the particular catalyst is intended. In any case, however, the concentrations of the metal components will be small, and will generally be within the range of from about 0.01% to about 5% by weight of the total catalyst.

Halogen is usually composited with the catalyst in concentrations of from about 0.01% to about 8% by weight of the total catalyst, and may be either fluorine, chlorine, iodine, bromine or mixtures of the same. In general, fluorine appears to be less easily removed from the catalyst during the process in which it is employed, and is, therefore, preferred in many instances. It is understood that the halogen may comprise a mixture of two or more of the aforementioned halogens; a particularly preferred mixture comprises fluorine and chlorine. The halogen is combined with one or more of the other components of the catalyst and is generally referred to as combined halogen.

Whatever the metal component, it is generally composited with a highly refractory inorganic oxide such as alumina, silica, zirconia, magnesia, titania, thoria, boria, strontia, etc. and mixtures of two or more including silica-alumina, alumina-boria, silica-thoria, silica-alumina-zirconia, etc. It is understood that the refractory inorganic oxides hereinabove set forth are intended to be illustrative rather than limiting unduly the method of the present invention.

It is further understood that these refractory inorganic oxides may be manufactured by any suitable method including separate, successive, or co-precipitation methods of manufacture, or they may be naturally-occurring substances such as clays or earths which may be purified with special treatment.

As hereinbefore stated, catalysts which have become deactivated through use may be partially regenerated by the removal of coke and other carbonaceous material, in conjunction with other, more recent, methods of catalyst reactivation. Each regeneration, however, produces a catalyst of slightly lower activity due to the continued presence of arsenic which is very difficult to remove completely. After each period of processing, the catalyst is contaminated with a greater quantity of arsenic than before, and eventually it becomes necessary to replace the catalyst, further regeneration not being economically justified. The high cost of the noble metal component, especially platinum, does not permit discarding the deactivated catalyst per se, although the metal component is present in relatively small amounts. Many methods are employed to recover platinum from platinum-containing catalytic composites. One method by which platinum may be recovered is by treating the noble metal containing composite with a suitable acid or alkali to dissolve the refractory inorganic oxide and to free the platinum in a finely divided or colloidal state. This method is satisfactory where the process in which the catalyst is used does not require substantially pure metal, and the presence of impurities, therefore, is not seriously detrimental. On the other hand, it is an important requirement that certain platinum-containing catalysts be substantially free from impurities, especially arsenic, and in such instances it is necessary to further separate the precipitated noble metal from such impurities.

Whatever the method utilized to recover the platinum from the catalytic composite, the arsenic contained therein is difficult to remove. Often the platinum is recovered containing quantities of arsenic, either as the element or in some combined state, which are significant, and sufficiently high to prohibit the use of the platinum for manufacturing new catalysts.

The object of the present invention is to recover noble metals from noble metal-containing composites which can no longer be regenerated economically whereby said noble metal is free from arsenic, and, therefore, readily suited for reuse in the manufacture of new catalyst.

In one embodiment the present invention relates to a method for recovering noble metals from noble metal-containing catalytic composites which comprises reacting said composite with an inorganic acid, separating the undissolved noble metal-containing material from the resulting mixture, dissolving at least a portion of said noble metal-containing material, adding a ferrous salt to the resulting solution, and recovering therefrom noble metal substantially free from arsenic.

In another embodiment the method of the present invention provides a method for recovering platinum from a deactivated platinum-alumina catalytic composite which comprises reacting said composite with an inorganic acid, separating the undissolved platinum-containing sludge from the resulting mixture, dissolving at least a portion of said sludge in aqua regia, adding a ferrous salt to the resulting solution and recovering platinum therefrom.

In a more specific embodiment the present invention provides a method for recovering platinum from a platinum-alumina halogen catalyst which comprises subjecting said catalyst to oxidation in a stream of air, reacting the resulting air-oxidized catalyst with an inorganic acid, separating the resulting undissolved platinum-containing sludge from the mixture, dissolving said sludge in aqua regia, adding ferrous chloride to the resulting mixture in the presence of hydrochloric acid and recovering platinum therefrom.

Prior to employing the method of the present invention, it is preferred to remove as many of the various contaminants as possible from the deactivated catalytic composite. The treatments employed, however, to effect the removal of these contaminants should neither enhance nor afford substantial loss of platinum particles. Generally, a deactivated catalyst contains metallic impurities, in addition to arsenic, either as elements or simple salts, as well as coke and other carbonaceous material. Such impurities are often readily removed by washing the catalytic composite with distilled water. The composite is then dried and subjected to an oxidation treatment to remove the coke and carbonaceous material.

The oxidation treatment may employ any free oxygen-containing gaseous material. Air is preferred due to its natural abundance and the economical advantage afforded through its utilization. The composite is usually subjected to oxidation effected at a temperature of from about 600° F. to about 1600° F., however, temperatures within the range of from about 800° F. to about 1400° F. are preferred. It is understood that the hereinabove described treatments need not necessarily precede the method of the present invention, and it is not intended to limit unduly the present invention to the previously described procedure. However, as hereinabove stated, it is preferred to remove as many of the contaminants as possible in order to facilitate the subsequent recovery of the platinum.

After the catalytic composite has been subjected to air oxidation, and other treatments to remove coke, carbonaceous material and other impurities, the composite is reacted with a suitable inorganic acid or strong alkali to dissolve the refractory inorganic oxide and free the platinum in a finely divided or colloidal state. The use of an inorganic acid is preferred to prevent further introduction of metallic impurities to the composite and of the inorganic acids, sulfuric acid and nitric acid or mixtures of the same are preferred. Hydrochloric acid may be advantageously employed to dissolve the refractory inorganic oxide, however, usually about 20% to about 40% by weight of the available platinum is also dissolved. Platinum dissolution may be prevented when employing hydrochloric acid by the addition of costly reagents to the mixture. However, the criticality of the concentrations of the acid and the reagent employed does not warrant the use of hydrochloric acid, especially in view of the fact that such reagents need not be employed when the digestion of the refractory oxide is effected by sulfuric acid and/or nitric acid.

Sulfuric acid is especially preferred due to its higher boiling point which permits the use of higher temperatures thereby facilitating the intended reaction. Any suitable concentration of sulfuric acid may be employed, and concentrations within the range of from about 25% to about 90% may be advantageously used; the preferred concentration of sulfuric acid is within the range of from about 35% to about 70%. During the digestion, the reaction mixture is maintained at a temperature of from about 210° F. to about 350° F. The reaction is facilitated by increased temperatures and, thus, it is preferred in some instances to impose superatmospheric pressure of the order of 50 p. s. i. g. upon the reaction mixture to permit the utilization of a higher temperature. The time of the heating and digesting will range from about 1 to about 12 hours and, in most instances, from about 2 to about 6 hours.

In accordance with the present invention, other acids, as well as alkaline substances, may be employed, although not with equivalent results. The platinum-refractory inorganic oxide composite, with or without combined halogen, may be reacted with chlorosulfuric, hydrobromic acids, in addition to those acids previously described, or strong alkali-metal hydroxide solutions such as sodium hydroxide, potassium hydroxide, etc. With an aluminum-platinum catalyst, sulfuric acid is preferred, although it is understood that with other catalysts the particular acid or alkali employed may be dependent upon the particular refractory inorganic oxide composited with the metal to be recovered.

The resulting mixture consists of an insoluble platinum-containing sludge and a solution of a water-soluble salt, the metallic component of which is the metallic component of the refractory inorganic oxide. For example, when a deactivated platinum-alumina catalyst is reacted with sulfuric acid, the alumina is dissolved forming aluminum sulfate which is readily soluble. The aluminum sulfate solution may be removed by any suitable means such as settling, filtering, decantation, etc. The residue which remains contains platinum, arsenic and minor quantities of other metallic impurities, ceramic material, carbon, etc. The residue may be dried at a temperature of from about 200° to about 800° F. for a period of from about 4 to about 10 hours and subsequently subjected to oxidation to remove the carbon if the carbon has not been previously removed.

The platinum-containing sludge is then treated with aqua regia, which treatment may be effected either by adding the nitric acid and hydrochloric acid together, or by first adding one acid and then the other. In the preferred method of the present invention, the acids are added together in a volumetric ratio of hydrochloric acid to nitric acid of about 3:1, and in a total amount of at least one gallon of acid per pound of platinum present in the sludge. The temperature of the resulting mixture is increased to a level within the range of from about 150° F. to about 200° F., and preferably within the range of from about 165° F. to about 185° F. Superatmospheric pressures may be imposed upon the mixture, however, the reaction will proceed readily at atmospheric pressure or below. In many instances, it is preferred to effect the dissolution of at least a portion of the platinum-containing sludge under a vacuum in order to prevent excessive foaming of the reaction mixture which results in a possible loss of the platinum. In some instances, it is preferred to maintain the mixture, after the addition of aqua regia, at room temperature for a period of from about 1 to about 4 hours. This procedure tends to decrease the foaming tendency of the mixture as the temperature is increased. The high temperature digestion of the platinum-containing sludge is continued for a period of from about 1 to about 4 hours, and is discontinued when all of the platinum has been dissolved. The resulting solution is filtered to remove any remaining undissolved impurities after which the solution is boiled down to remove excess hydrochloric and nitric acid and especially to decompose nitrogeneous platinum salts. Deionized water is added to dissolve any platinum-containing crystalline salts which are formed during the removal of the acids, and the resulting solution is again filtered to recover an aqueous solution of impure chloroplatinic acid. When necessary, the hereinabove described treatment, either with hydrochloric acid alone, or together with nitric acid, may be repeated to further insure complete recovery of the platinum from the sludge.

The chloroplatinic acid solution resulting from the aqua regia digestion may be evaporated to dryness, and, if the catalyst in which the platinum is to be eventually utilized does not require substantially pure platinum, the residue resulting from such evaporation may be employed as the source of platinum. As hereinbefore set forth, there are instances existing where even small quantities of impurities are intolerable, and especially when such impurities constitute a large amount of arsenic. When the arsenic content is too great to permit reuse of either the chloroplatinic acid as such or of the platinum contained therein, the solution of chloroplatinic acid resulting from the digestion of the sludge is boiled down as hereinbefore described, to remove excess acid and deionized water is added to dissolve any crystalline salts formed thereby. It has been found that the evaporation of the chloroplatinic acid solution to the point of crystalline-salt formation effectively removes a maximum quantity of a nitric acid, and, as hereinbefore set forth, decomposes nitrogeneous platinum compounds, which are detrimental to the subsequent removal of arsenic.

An aqueous solution of hydrogen chloride is then added to the mixture at a rate which is equivalent to the rate at which the overhead distillate is collected. The concentration of the hydrochloric acid solution is generally within the range of from about 25% to about 90%, the preferred concentration being within the range of from about 35% to about 80%.

Prior to the addition of the aqueous solution of hydrochloric acid, the temperature of the mixture is raised to a level of from about 210° F. to about 350° F. A suitable ferrous salt is added to the mixture, and may be added either before or during the addition of the hydrochloric acid. It is preferred, in many instances, to employ hydrochloric acid before adding the ferrous salt in order to insure substantially complete removal of nitric acid and decomposition of nitrogeneous platinum salts. In any case, hydrochloric acid is used in conjunction with the ferrous salt. Ferrous chloride is the preferred salt, however, other ferrous salts may be employed, although not necessarily with equivalent results. Other ferrous salts which may be used include the carbonate, sulfate, ferrous bromide, ferrous fluoride, etc. The ferrous halides are preferred, especially ferrous chloride, in order to lessen the quantity of impurities added to the mixture.

The ferrous salt may be added in any suitable manner, either as the pure compound, the hydrate or as an aqueous solution, and is added in an amount which is dependent upon the quantity of arsenic remaining in the mixture. In the preferred method of the present invention, the ferrous chloride is added as an aqueous solution in a weight ratio of ferrous chloride to arsenic of at least 6:1. An excess of ferrous chloride is preferred to insure complete removal of the arsenic, however, if too much ferrous chloride is employed, the mixture may become contaminated with an excessive quantity of iron, thereby necessitating additional purification treatments. The aqueous solution of hydrogen chloride is then added, at the rate at which the overhead distillate is collected, for a period of from about 3 to about 6 hours, after which time the mixture is sampled and analyzed for arsenic content.

After complete removal of the arsenic, the mixture is subjected to evaporation to remove excessive hydrochloric acid, and to concentrate the resulting solution of chloroplatinic acid. The platinum may be recovered as elemental platinum from the concentrated chloroplatinic acid solution in any suitable manner. One of the preferred methods is to cause the platinum to precipitate out of solution by the addition of a precipitating agent such as hydrazine hydrochloride, hydroquinone, formaldehyde, catechol, aminophenols, etc.

The concentrated chloroplatinic acid may either be used as such or further purified by other treatments if desired. Such further treatments may comprise precipitating and redissolving of the platinum in aqua regia. In addition, the chloroplatinic acid may be subjected to an ion exchange system, with or without further precipitation and redissolution. These treatments, and others, may or may not be necessary, depending upon the subsequent use of the platinum contained in the concentrated chloroplatinic acid solution.

Briefly, the preferred method for recovering noble metals, especially platinum, from a deactivated noble metal-containing catalytic composite, comprises washing the deactivated catalyst with distilled water to remove any soluble impurities. The catalyst is then dried and subjected to an oxidizing treatment, in the presence of air, effected at a temperature of from about 800° F. to about 1400° F. The oxidized catalyst is reacted with an aqueous solution of from about 35% to about 70% sulfuric acid for a period of from about 2 to about 6 hours. The sulfuric-acid digestion is effected at a temperature of from about 210° F. to about 350° F. and it is preferred, in some instances, to impose superatmospheric pressure of the order of 50 p. s. i. g. to permit the utilization of higher temperature.

The mixture resulting from the sulfuric-acid digestion is either filtered or flocculated in settlers to recover the insoluble platinum-containing sludge. The sludge is then reacted with aqua regia, wherein the hydrochloric and nitric acids are added together in a volumetric ratio of about 3:1, in an amount of at least one gallon of total acid per pound of platinum contained in the sludge. The aqua-regia digestion is effected at a temperature within the range of from about 165° F. to about 185° F. for a period of from about 1 to about 4 hours. Superatmospheric pressure may be imposed upon the mixture, although it is preferred to effect the aqua-regia digestion at atmospheric pressure or below.

The mixture resulting from the aqua-regia digestion is filtered to remove the remaining insoluble impurities, and the solution is evaporated until crystalline-salt formation is effected; the salts thus formed are dissolved with deionized water. An aqueous solution of ferrous chloride is added to the solution in a weight ratio, of ferrous chloride to the arsenic present, of at least 6:1. An aqueous solution of from about 25% to about 90% by weight of hydrogen chloride is added at the rate at which overhead distillate is collected for a period of from about 3 to about 6 hours. As hereinbefore stated, it is preferred in some instances to utilize hydrochloric acid before the addition of the ferrous salt. In any case, however, hydrochloric acid is employed after the addition of the ferrous salt.

The resulting solution is boiled down to remove excessive hydrochloric acid and to concentrate the chloroplatinic acid. It is preferred to recover the platinum as pure chloroplatinic acid for ease in handling and storage. Also, chloroplatinic acid is a suitable source of platinum, and affords a convenient manner for utilizing the platinum in the manufacture of new catalysts.

The following example further illustrates the method and utility of the present invention, and the benefits afforded through the use of the same. The catalyst was obtained from a commercial process wherein it had become deactivated after an extended period of use during which it was employed in the processing of hydrocarbon fractions to produce high octane motor fuel.

*Example*

A portion of deactivated platinum-alumina-halogen catalyst was thoroughly washed with distilled water to remove soluble material, dust, loose coke particles, etc. The washed catalyst was dried and subjected to an air-oxidation treatment effected at a temperature of 1100° F. The catalyst was cooled to room temperature and reacted with an aqueous solution of 60% by weight of sulfuric acid and the temperature of the mixture was raised to 300° F. Superatmospheric pressure of the order of 50 p. s. i. g. was imposed upon the mixture; the stated conditions of temperature and pressure were maintained for a period of four hours. After this time, the mixture was cooled and filtered to recover the insoluble platinum-containing sludge which was analyzed for platinum content.

Aqua regia was added to the sludge in an amount of one gallon of total acid per pound of platinum therein. The aqua regia was a 3:1 volumetric ratio of hydrochloric acid to nitric acid, and was added to the sludge at room temperature. The resulting mixture was maintained at room temperature for a period of 4 hours, after which time the temperature was raised to 175° F. and the reaction effected under a vacuum of 15 inches of mercury. These conditions were maintained for a period of four hours after which time the mixture was cooled to room temperature and filtered. The solution was boiled down until crystalline salts started to form: these salts were dissolved in deionized water to yield a clear solution of chloroplatinic acid. The chloroplatinic acid was sampled and analyzed for arsenic and platinum content.

A one-liter sample of the chloroplatinic acid solution containing 20% by weight of platinum and 0.55% by weight of arsenic was placed in a distillation flask. Heat was applied to the distillation flask by electrically-controlled, insulated ceramic heaters, and the temperature of the solution raised thereby to 330° F. An aqueous solution of 35% by weight of hydrogen chloride was introduced into the distillation flask at a rate of 200 cc./hr., the rate at which overhead distillate was collected. The solution in the flask was sampled and analyzed for arsenic content every six hours for a period of 24 hours: the results of the analyses are shown below:

| Time in hours: | Wt. percent arsenic [1] |
|---|---|
| 0 | 0.55 |
| 6 | 0.40 |
| 12 | 0.30 |
| 18 | 0.25 |
| 24 | 0.20 |

[1] Based upon platinum content.

After removal of the 24-hour sample, 16.4 grams of ferrous chloride ($F_3Cl_3 \cdot 4H_2O$) were added to the solution remaining in the flask, and the distillation continued. As described previously, an aqueous solution of 35% by weight hydrogen chloride was added to the distillation flask at a rate of 200 cc./hr., the rate at which overhead distillate was being collected. After the addition of ferrous chloride, the solution in the flask was sampled and analyzed for arsenic content every hour for a total period of three hours: the results of the analyses are shown immediately below:

| Time in hours: | Wt. percent arsenic |
|---|---|
| 1 | nil |
| 2 | nil |
| 3 | nil |

This example illustrates the benefits derived from the utilization of the method of the present invention. Arsenic is effectively totally removed from the solution of chloroplatinic acid thereby effecting a material which is suitable as the source of platinum in the manufacture of platinum-containing catalytic composites.

I claim as my invention:

1. A method for recovering noble metals from deactivated noble metal-containing catalytic composites contaminated with arsenic which comprises reacting said composite with an inorganic acid, separating the undissolved noble metal-containing sludge from the resulting mixture, dissolving said noble metal-containing sludge, adding hydrochloric acid and a ferrous salt to the resulting solution and subjecting the mixture to distillation.

2. The method of claim 1 further characterized in that said noble metal comprises platinum.

3. A method for recovering platinum from a deactivated platinum-alumina catalytic composite contaminated with arsenic which comprises dissolving the alumina out of said composite, separating the undissolved platinum-containing sludge from the resulting mixture, dissolving said sludge in aqua regia, adding hydrochloric acid and a ferrous salt to the resulting solution and subjecting the mixture to distillation.

4. The method of claim 3 further characterized in that said ferrous salt comprises ferrous halide.

5. The method of claim 4 further characterized in that said ferrous halide comprises ferrous chloride.

6. A method for recovering platinum from a platinum-inorganic oxide catalyst contaminated with arsenic which comprises dissolving the oxide out of said catalyst, separating the undissolved platinum-containing sludge from the resulting mixture, dissolving at least a portion of said sludge in aqua regia, adding ferrous chloride and hydrochloric acid to the resultant arsenic-containing chloroplatinic acid solution and subjecting the mixture to distillation.

7. The method of claim 6 further characterized in that said ferrous chloride is added in a weight ratio of ferrous chloride to the arsenic contained in said catalyst of at least 6:1.

8. The method of claim 6 further characterized in that said ferrous chloride is added in the presence of an aqueous solution of from about 35% to about 80% by weight of hydrogen chloride at a temperature of from about 210° F. to about 350° F.

9. A method for recovering platinum from a deactivated platinum-inorganic oxide catalyst contaminated with arsenic which comprises dissolving the oxide out of said catalyst, separating the resulting mixture to recover the insoluble platinum-containing sludge, dissolving at least a portion of said sludge in aqua regia at a temperature of from about 150° F. to about 200° F., removing excess acid from the resulting solution, adding thereto ferrous chloride and an aqueous solution of from about 25% to about 90% by weight of hydrogen chloride and subjecting the mixture to distillation.

10. A method for recovering platinum from a chloroplatinic acid solution contaminated with arsenic which comprises adding to said solution ferrous chloride in a weight ratio of ferrous chloride to the arsenic contained in said solution of at least 6:1, reacting the resulting solution with an aqueous solution of from about 35% to about 80% hydrogen chloride at a distillation temperature of from about 210° F. to about 350° F. for a period of from about 3 to about 6 hours, removing excess acid from the resulting solution, and recovering platinum therefrom.

11. In the recovering of a noble metal from a composite containing the same and arsenic, wherein there is formed an arsenic-containing solution of the noble metal, the method of removing the arsenic which comprises subjecting said solution to distillation together with added hydrochloric acid and a ferrous salt.

12. The method of removing arsenic from a chloroplatinic acid solution containing the same which comprises subjecting said solution to distillation together with added hydrochloric acid and a ferrous salt.

13. The method of claim 6 further characterized in that said salt is ferrous chloride.

14. The method of removing arsenic from a chloroplatinic acid solution containing the same which comprises subjecting said solution to distillation while adding hydrochloric acid thereto over a substantial period of the distillation, thereafter adding ferrous chloride and continuing the distillation in the presence of the ferrous chloride.

References Cited in the file of this patent

UNITED STATES PATENTS

| | | |
|---|---|---|
| 981,451 | McKechnie et al. | Jan. 10, 1911 |
| 1,770,866 | Smith | July 15, 1930 |
| 2,635,080 | Appell | Apr. 14, 1953 |
| 2,686,114 | McGauley et al. | Aug. 10, 1954 |
| 2,710,799 | Leopard | June 14, 1955 |
| 2,786,752 | Appell | Mar. 26, 1957 |
| 2,787,540 | Appell | Apr. 2, 1957 |